United States Patent
Weith

(10) Patent No.: US 7,445,574 B2
(45) Date of Patent: *Nov. 4, 2008

(54) DRIVE AXLE WITH VARIABLE OIL FLOW MECHANISM

(75) Inventor: Frank C. Weith, Shelby Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 18 days.

This patent is subject to a terminal disclaimer.

(21) Appl. No.: 11/714,288

(22) Filed: Mar. 5, 2007

(65) Prior Publication Data

US 2007/0149339 A1   Jun. 28, 2007

Related U.S. Application Data

(63) Continuation of application No. 11/082,250, filed on Mar. 16, 2005, now Pat. No. 7,189,178.

(51) Int. Cl.
*F16H 57/04* (2006.01)

(52) U.S. Cl. .................. 475/160; 74/467; 184/6.12

(58) Field of Classification Search ............. 74/468; 184/79; 475/160, 220, 88, 90
See application file for complete search history.

(56) References Cited

U.S. PATENT DOCUMENTS

| | | | |
|---|---|---|---|
| 2,840,186 | A | 6/1958 | Nyland |
| 3,470,767 | A | 10/1969 | Gray |
| 5,033,575 | A | 7/1991 | Takeshita et al. |
| 5,584,773 | A | 12/1996 | Kershaw et al. |
| 5,634,530 | A | 6/1997 | Mackawa et al. |
| 5,839,084 | A | 11/1998 | Takasaki et al. |
| 5,961,419 | A | 10/1999 | Hisano et al. |
| 6,092,628 | A | 7/2000 | Hinton et al. |
| 6,617,968 | B1 | 9/2003 | Odisho et al. |
| 6,672,420 | B2 | 1/2004 | Porter |
| 6,997,284 | B1 | 2/2006 | Nahrwold |

*Primary Examiner*—Richard M. Lorence
*Assistant Examiner*—Edwin A. Young
(74) *Attorney, Agent, or Firm*—Harness, Dickey & Pierce, P.L.C.

(57) ABSTRACT

An axle assembly including a differential gear set having a ring gear. The axle assembly includes a carrier assembly housing that contains the differential gear set and an arcuate fence disposed adjacent to the ring gear that connects to the carrier assembly housing. A moveable plate slidingly connects to the arcuate fence. The moveable plate has an open position, a closed position and a plurality of positions therebetween. The closed position is closer to the ring gear than the open position. The arcuate fence and/or the moveable plate may reduce churning of the lubrication to increase the cooling efficacy of the lubrication.

27 Claims, 8 Drawing Sheets

DRIVE AXLE WITH VARIABLE OIL FLOW MECHANISM

CROSS-REFERENCE TO RELATED APPLICATIONS

This application is a continuation of U.S. patent application Ser. No. 11/082,250 filed on Mar. 16, 2005 now U.S. Pat. No. 7,189,178. The disclosure of the above application is incorporated herein by reference.

FIELD OF THE INVENTION

The present invention relates to a power transfer unit and, more particularly, to a variable oil flow mechanism within an axle assembly.

BACKGROUND OF THE INVENTION

The traditional axle assembly includes a carrier housing that houses a differential gear set having a ring gear. The carrier housing also includes a lubrication sump that contains a volume of a lubricant to lubricate the differential gear set. As the ring gear of the differential gear set turns, the ring gear can acts as a pump thus moving the lubricant throughout the axle assembly. While the lubricant can lubricate the differential gear set, the lubricant can also cool the differential gear set. It will be appreciated that as the rotational velocity of the gears of the differential gear set increase, the lubricant can be chaotically churned about the carrier housing. As the churning of the lubricant increases, the ability of the lubricant to cool the differential gear set decreases.

SUMMARY OF THE INVENTION

An axle assembly including a differential gear set having a ring gear. The axle assembly includes a carrier housing that contains the differential gear set and a variable oil flow mechanism. The variable oil flow mechanism includes a fence disposed adjacent to the ring gear that is connected to the carrier housing and a moveable plate slidingly connected to the fence. The moveable plate has an open position, a closed position and a plurality of positions therebetween. The closed position is closer to the ring gear than the open position.

Further areas of applicability of the present invention will become apparent from the detailed description provided hereinafter. It should be understood that the detailed description and specific examples, while indicating the various embodiment of the invention, are intended for purposes of illustration only and are not intended to limit the scope of the invention.

BRIEF DESCRIPTION OF THE DRAWINGS

The present invention will become more fully understood from the detailed description, the appended claims and the accompanying drawings, wherein:

DETAILED DESCRIPTION OF THE VARIOUS EMBODIMENTS

The following description of the various embodiments is merely exemplary in nature and is in no way intended to limit the invention, its application or uses. As used herein, the term module, submodule, control module and/or device refers to an application specific integrated circuit (ASIC), an electronic circuit, a processor (shared, dedicated, or group) and memory that executes one or more software or firmware programs, a combinational logic circuit, or other suitable components that provide the described functionality. Moreover, vehicle controllers may communicate with various vehicle systems using digital or analog inputs and outputs and/or an automotive communications network including, but not limited to, the following commonly used vehicle communications network standards: CAN and SAE J1850.

Figure 1:
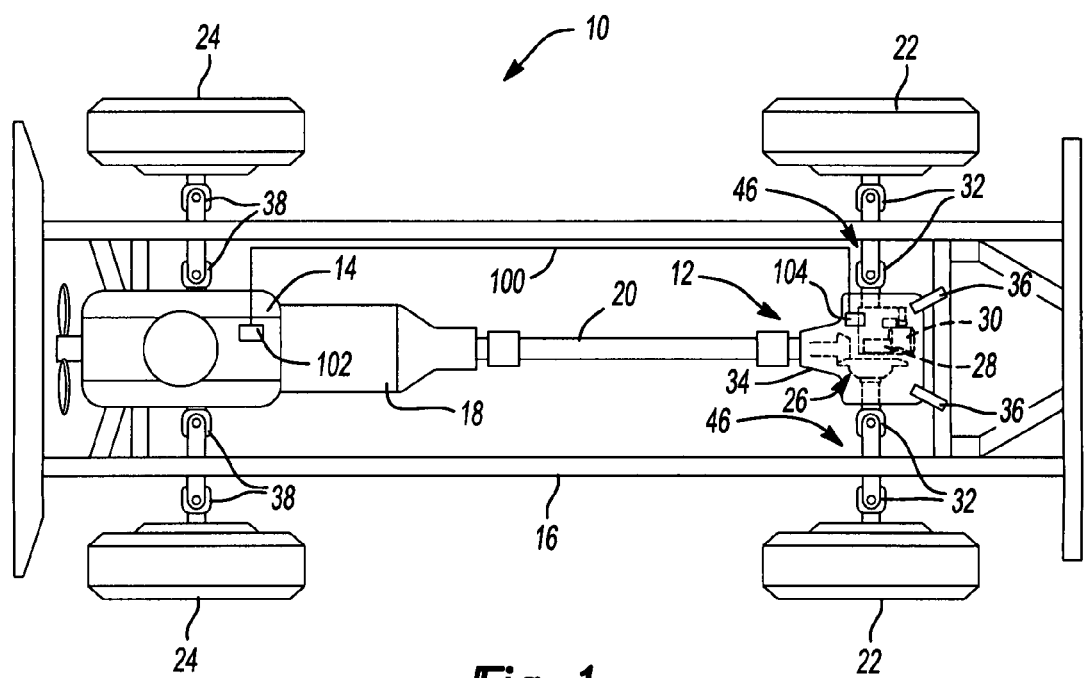
FIG. 1 is a top view of an exemplary vehicle having an axle assembly constructed in accordance with the teachings of the present invention.

With reference to FIG. 1, an exemplary vehicle 10 is shown with an axle assembly 12 constructed in accordance with the teachings of the present invention. The exemplary vehicle 10 includes an engine 14, a frame 16, a transmission 18, a driveshaft 20, a pair of driven-wheels 22 and a pair of optionally-driven-wheels 24. The engine 14 produces an output having a torque component in a manner known in the art and transmits the output to the transmission 18. The transmission 18 may reduce the rotational velocity and increase the torque of the output produced by the engine 14. The transmission 18 then transmits the torque to the axle assembly 12 through the driveshaft 20. The axle assembly 12 transmits the torque via a differential gear set 26 to the pair of driven-wheels 22, which function to propel the vehicle 10. A variable oil flow mechanism having a fence 28 with a moveable plate 30 coupled thereto may be disposed adjacent to the differential gear set 26, as below discussed in detail.

The optionally-driven-wheels 24 may connect to the transmission 18 in a manner known in the art (e.g., in a four-wheel and/or all-wheel drive configuration). The axle assembly 12 may include a plurality of constant-velocity joints 32 such that the axle assembly 12 may be configured as an independent rear differential assembly. More specifically, a carrier housing 34 may be coupled to the frame 16 (e.g., with frame braces 36), allowing the pair of driven-wheels 22 to move (other than rotate) independently of the carrier assembly housing 34. Moreover, the optionally-driven-wheels 24 may connect to the transmission 18 via a plurality of constant velocity joints 38 (e.g., in the four-wheel and/or all-wheel drive configuration), allowing the optionally-driven-wheels 24 to move (other than rotate) independently of the transmission 18. It will be appreciated that the vehicle 10 may be constructed with a unit body construction in lieu of a traditional rail frame (an example of which is shown in FIG. 1) or may be constructed with combinations of the unit body construction and the traditional rail frame.

Figure 2:
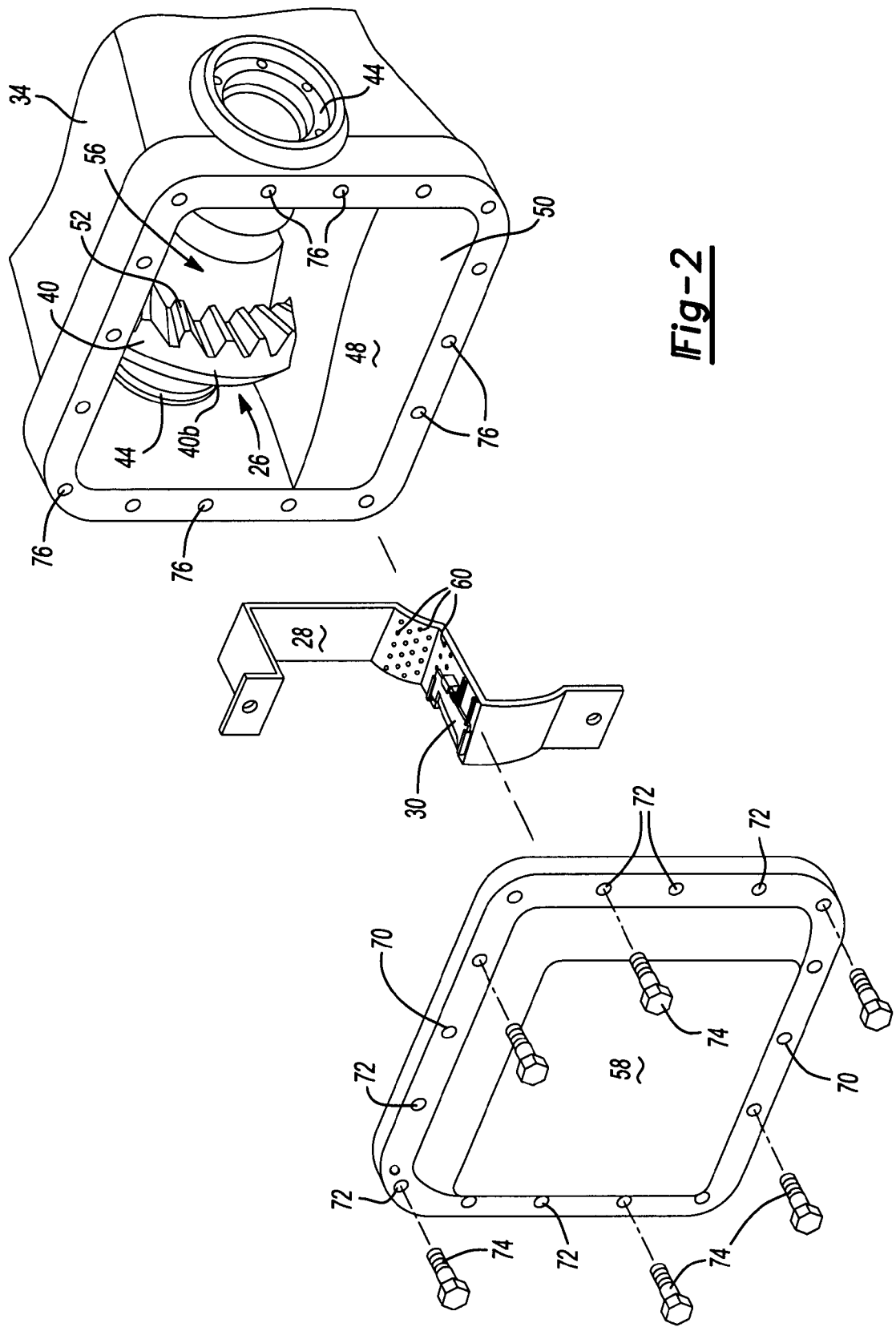
FIG. 2 is a perspective view of a carrier housing, a carrier housing cover, a differential gear set and a variable oil flow mechanism having a moveable plate and a fence constructed in accordance with the teachings of the present invention and shown with the fence connected to the carrier housing cover.
Figure 3:
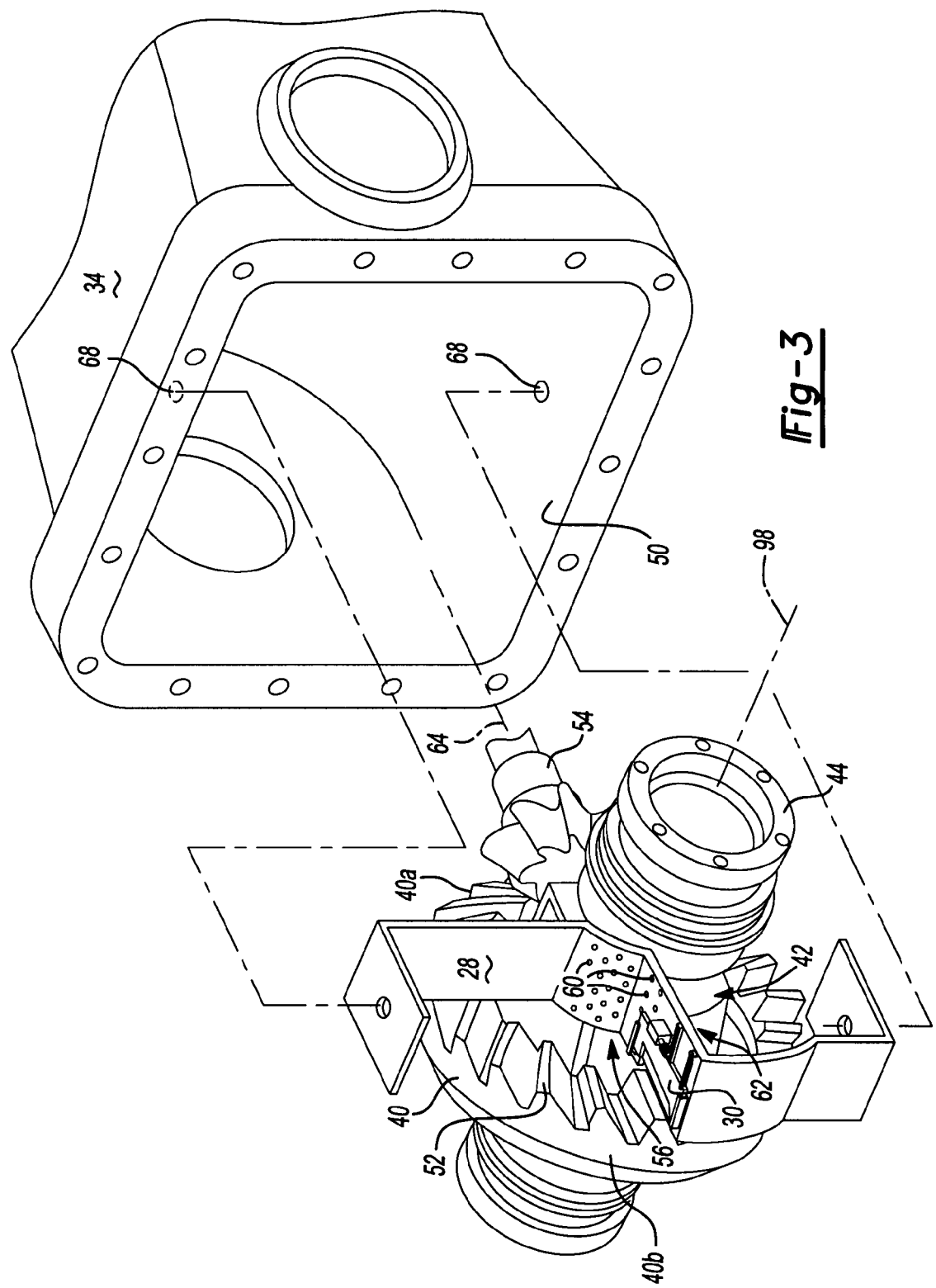
FIG. 3 is similar to FIG. 2 except that the fence is connected to the carrier housing.
Figure 4:
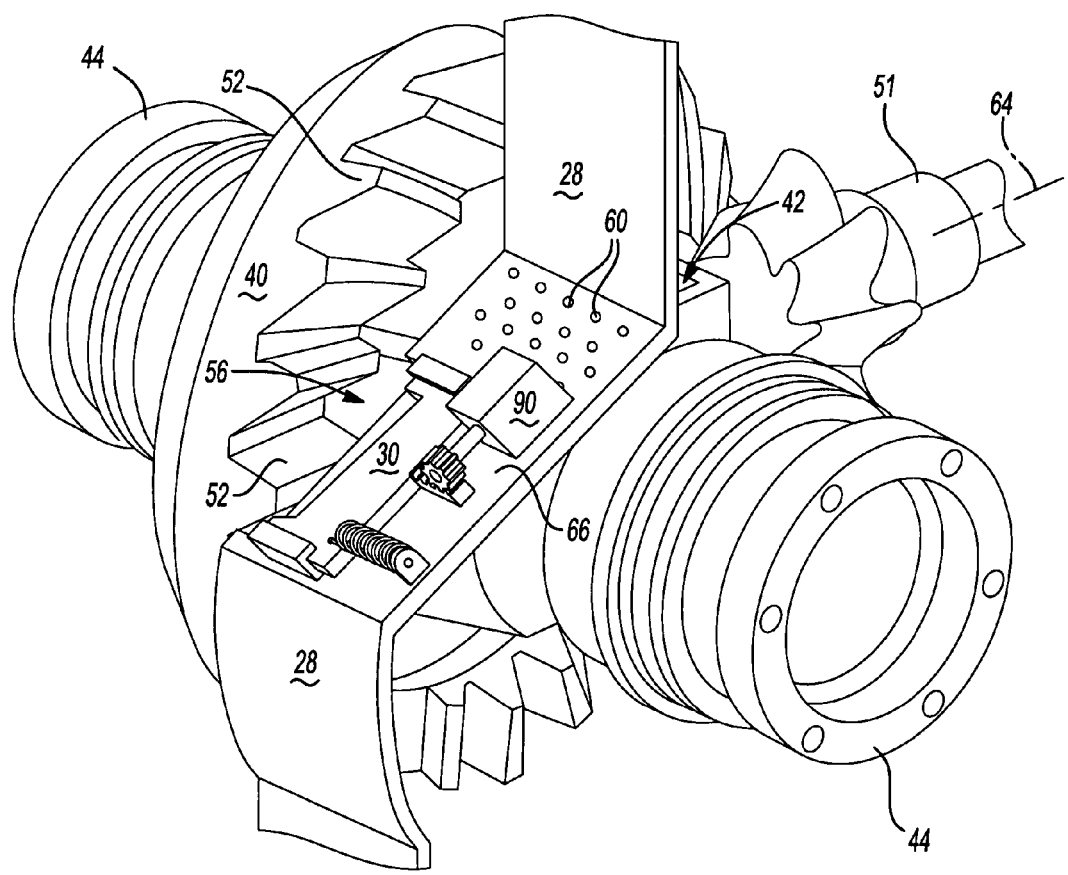
FIG. 4 is similar to FIG. 2 and shows an alternative configuration of the fence and the moveable plate associated with a variable oil flow mechanism constructed in accordance with the teachings of the present invention.

With reference to FIGS. 2, 3 and 4, the carrier assembly housing 34 is shown in accordance with the teachings of the present invention. The carrier housing 34 contains the differential gear set 26. The differential gear set 26 includes a ring gear 40 and side gears 42, which attach to driveshaft flanges 44 in a manner known in the art. Each of the driveshaft flanges 44 may connect to a half-shaft 46 (FIG. 1) for driving wheels 22 in a manner known in the art.

The carrier housing 34 also contains a volume of lubrication 48 contained in a lubrication sump 50. At least a portion of the differential gear set 26 resides in the lubrication 48, as shown in FIG. 2. More specifically, the ring gear 40 (or a portion thereof as shown in FIG. 2) rotates through the lubrication 48. As the ring gear 40 rotates through the lubrication 48, the ring gear 40 may chaotically toss (i.e., churn) the lubrication 48 about the carrier housing 34. It will be appreciated that the lubrication 48 may be used to cool and lubricate the differential gear set 26 because, among other things, the differential gear set 26 heats during use due to friction between its respective components.

The more the lubrication 48 is churned and chaotically tossed about the carrier housing 34, the less effective the lubrication 48 is at cooling the differential gear set 26 and other components of the axle assembly 12. In one example, the variable oil flow mechanism is oriented such that the fence 28 is positioned adjacent to the ring gear 40 to catch and/or skim the lubrication 48 off the ring gear 40 and/or ring gear teeth 52, as the ring gear 40 rotates up and out of the lubrication sump 50. Because at least a portion of the lubrication 48 may strike the fence 28 instead of being churned and chaotically tossed about the carrier housing 34, the lubrication 48 may cool the differential gear set 26 relatively more effectively.

The ring gear 40 of the differential gear set 26 is rotatably driven by a pinion shaft 54 (FIGS. 3 and 4) in a manner known in the art. It will be appreciated that as the speed of the engine 14 (FIG. 1) increases, the rotational speed of the driveshaft 20 (FIG. 1) increases for a given transmission gear ratio. As the rotational speed of the driveshaft 20 increases, the rotational speed of the pinion shaft 54 increases; this increases the rotational speed of the ring gear 40. As the rotational speed of the ring gear 40 increases, the potential for the ring gear 40 to churn and chaotically toss about the lubrication 48 increases.

The fence 28 may be disposed in a space 56 defined adjacent the ring gear 40 between the carrier housing 34 and a carrier housing cover 58. As the lubrication 48 is thrown against the fence 28, the lubrication may drip and/or travel back down the fence 28 into the lubrication sump 50. It will be appreciated that the reduced motion (i.e., less churning and/or chaotic tossing) of the lubrication 48 compared to an implementation without the fence 28, allows the lubrication 48 to cool the differential gear set 26 more effectively. Moreover, the fence 28 may include a plurality of drain holes 60 further allowing the lubrication 48 to drip back into the lubrication sump 50, which may further promote cooling efficacy by the lubrication 48.

It may be shown that the controlled return of the lubrication 48 to the lubrication sump 50 (i.e., dripping down or traveling down the fence 28) provides relatively better cooling efficacy of the differential gear set 26 when compared to the axle assembly 12 without the variable oil flow mechanism. The slow dripping and/or traveling down the fence 28 allows the lubrication 48 to cool more readily as it returns to the lubrication sump 50. It will be appreciated that the shape, size and position of the fence 28 relative to the ring gear 40 may be specific to each axle assembly model and, as such, the size and configuration of the fence 28 may vary accordingly.

In one example, the fence 28 may be arranged in relation to the differential gear set 26 and the ring gear 40 in such a way that a portion of the fence 28 is horizontal, as generally indicated by reference number 62 (FIG. 3). By way of the above example, the horizontal portion 62 of the fence 28 may be parallel to a pinion shaft rotational axis 64. In another example, the fence 28 may be arranged in relation to the differential gear set 26 and the ring gear 40 in such a way that a portion of the fence 28 is slanted (i.e., not horizontal), as generally indicated by reference number 66 (FIG. 4). In the various examples, various portions of the fence 28 may bend around various portions of the differential gear set 26 and, as such, the fence 28 may have one or more arcuate portions.

In one example, the fence 28 may connect to the carrier housing 34, as illustrated in FIG. 3. By way of the above example, the fence 28 may attach to the carrier housing 34 at at least one fence attachment point 68. The fence 28 may attach to the carrier housing 34 using mechanical fasteners, chemical bonding, a molded press-fit connection (e.g., a lip press-fit into a groove) and/or combinations thereof.

In one example, the fence 28 may connect to the carrier housing cover 58, as illustrated in FIG. 2. By way of example, the fence 28 may attach to the carrier housing cover 58 or more fence attachment points 70. It will be appreciated that the fence attachment points 70 may coincide, for example, with apertures 72 formed in the carrier housing cover 58, which may receive fasteners 74. Complimentary apertures 76 formed in the carrier housing 34 may also receive the fasteners 74 to attach the carrier housing cover 58 to the carrier housing 34 in a manner known in the art. By way of the above example, the fence 28 may also be attached to the carrier housing cover 58 using chemical bonding, a molded press-fit connection (e.g., the lip and the groove) and/or combinations thereof.

Figure 5A:
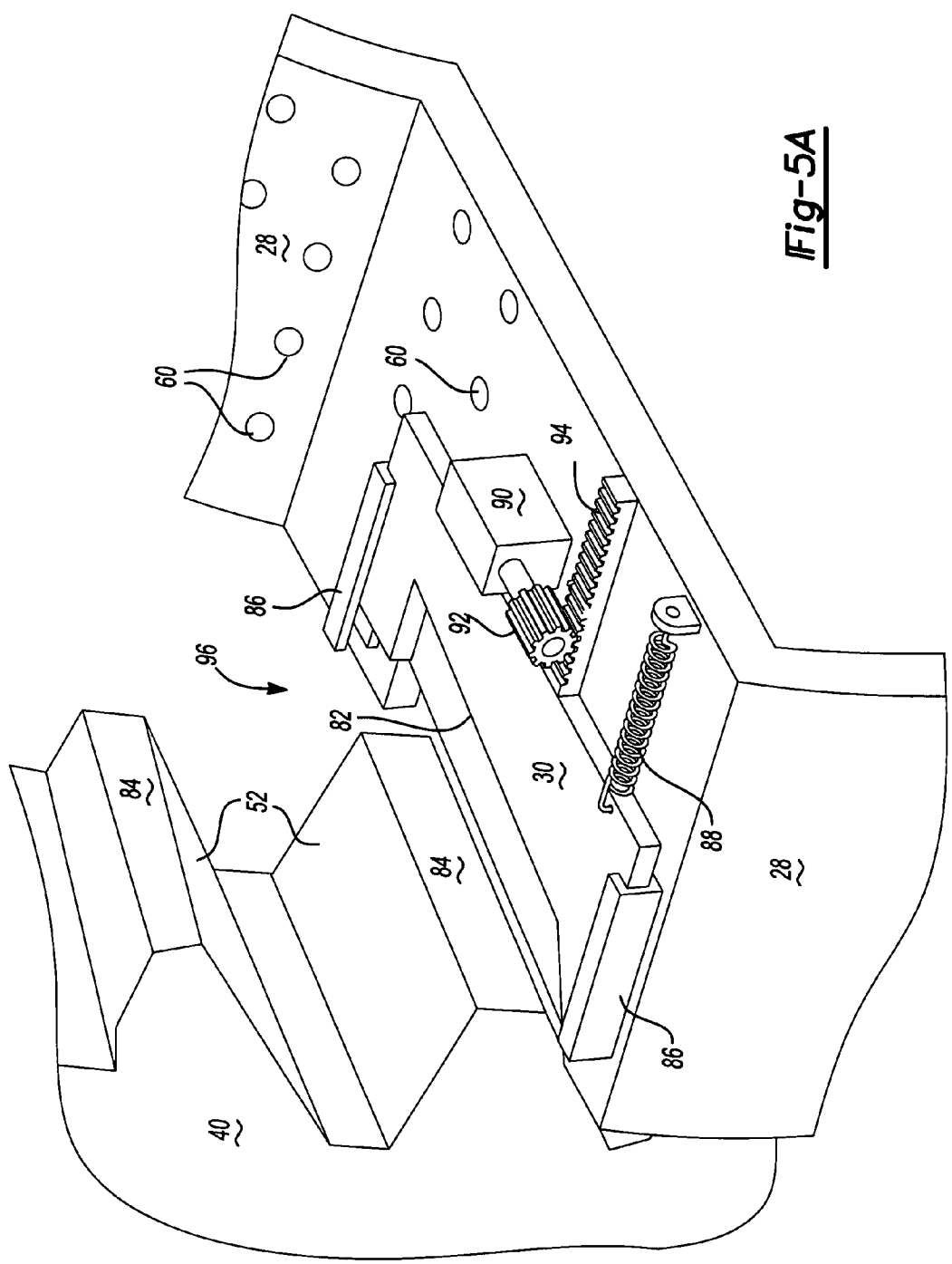
FIG. 5A is a perspective view of the moveable plate, a spring and a motor constructed in accordance with the teaching of the present invention showing the moveable plate in an open position.
Figure 5B:
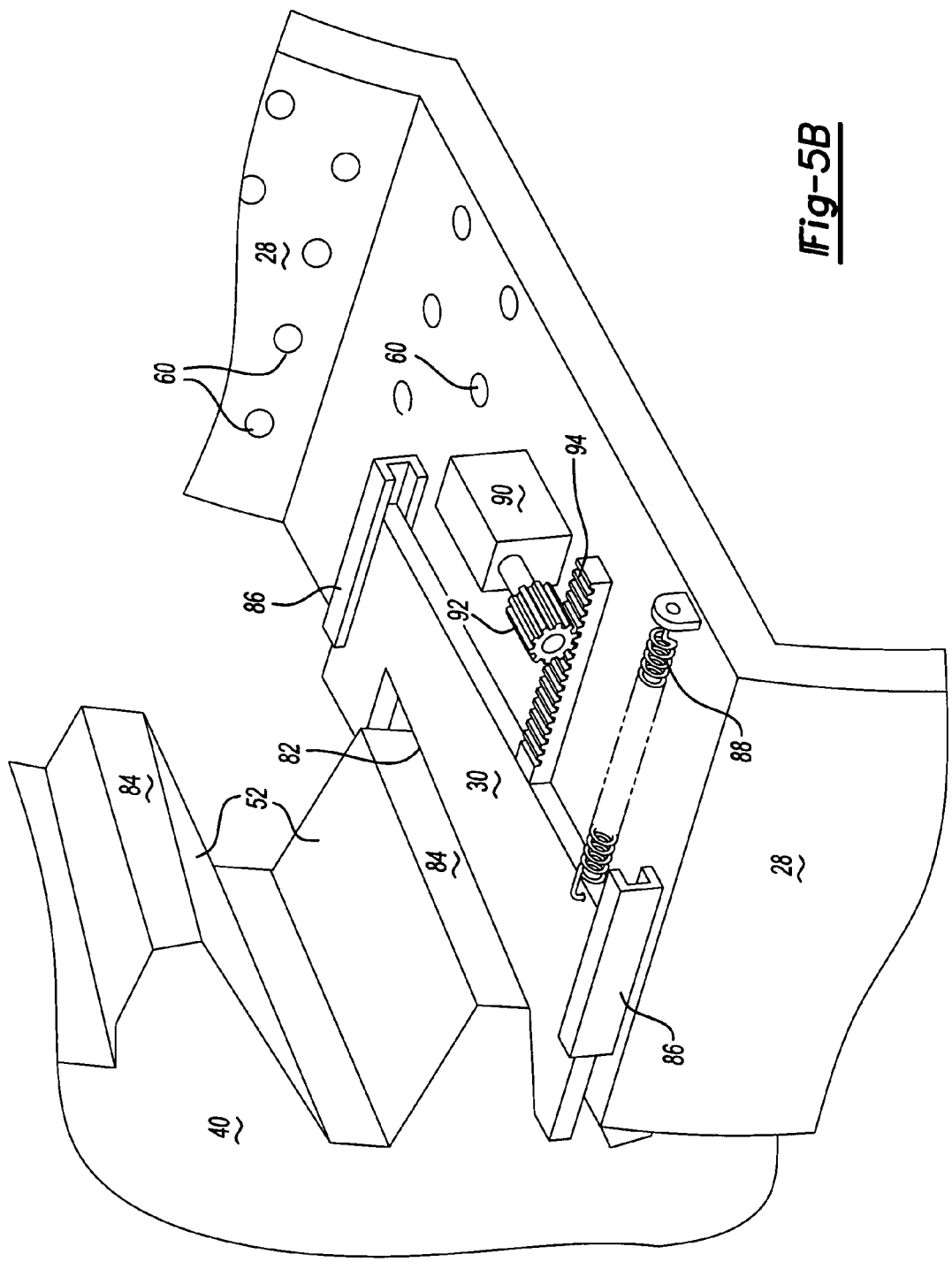
FIG. 5B is similar to FIG. 5A and shows the moveable plate in a closed position.

With reference to FIG. 5A and FIG. 5B, the movable plate 30 is slidingly attached to the fence 28. The movable plate 30 can slide relative to the ring gear teeth 52 and thus move between an open position 78 (FIG. 5A), a closed position 80 (i.e., closer to the ring gear) (FIG. 5B) and a plurality of positions therebetween. When the movable plate 30 is in its closed position 80, for example, a face 82 of the moveable plate 30 may be about 3 millimeters (about 0.12 inches) away from a top face 84 of each of the ring gear teeth 52. When the movable plate 30 is in the open position 78, the face 82 of the movable plate 30 may be at least about 20 millimeters (about 0.79 inches) away from the top face 84 of the ring gear teeth 52. It will be appreciated that the distance between the face 82 of the movable plate 30 and top face 84 of the ring gear teeth 52 may be specific to each axle assembly model.

A pair of channel brackets 86, a spring 88 and a motor 90 may be mounted to the fence 28 and connect to the movable plate 30. The movable plate 30 can slide in the pair of channel brackets 86 as it moves between the open position 78 (FIG. 5A) and the closed position 80 (FIG. 5B). The spring 88 can couple the moveable plate 30 to the fence 28. It will be appreciated that more than one spring may be used. Whether the moveable plate 30 is in the open position 78, the closed position 80 or the plurality of positions therebetween, the spring 88 applies a force to the moveable plate 80. By constantly applying the force to the moveable plate 30, the spring 88 reduces vibrations experienced by the moveable plate 30 and the fence 28.

The motor 90 can have a gear 92 (e.g., a spur gear) connected thereto. The gear 92 can mesh with a toothed rack 94 formed on the moveable plate 30. By way of example, the motor 90 can rotate the gear 92 to drive the moveable plate 30 between its open position 78 and its closed position 80, which may further elongate the spring 88 (i.e., further against the bias of the spring 88). It will be appreciated that a default position 96 of the movable plate 30 is in its open position 78. By way of example, the motor 90 may hold the movable plate 30 in the closed position 80, the open position 78 and a plurality of positions therebetween but if the motor 90 were to fail, the spring 88 returns the movable plate 30 to its open position 78.

The ring gear 40 has an axis of rotation 98 (FIG. 3) upon which the ring gear 40 spins. To that end, one side 40a of the ring gear 40 is turning into the lubrication sump 50 while the other side 40b of the ring gear 40 is coming up from the lubrication sump 50. It will be appreciated that the side 40b of the ring gear 40 is rotating out of the lubrication sump 50 is the side 40b of the ring gear 40 that may throw lubrication (i.e., churn and/or chaotically toss) around the carrier assembly housing 34, thus reducing the cooling efficacy of the lubrication 48. As such, the movable plate 30 may be orientated on the side 40b of the ring gear 40 that is rotating out of the lubrication sump 50. It will be appreciated that the side 40b that is rotating out of the lubrication sump 50 is dependent upon the direction of rotation of the ring gear 40 and, as such, the fence 28 and/or the moveable plate 30 may be oriented accordingly.

By way of the above examples, the fence 28 and the movable plate 30 may be fixedly mounted to the carrier housing cover 58. The cover 58 may be releaseably connected to the carrier housing 34. It will be appreciated that the cover 58 can be removed to service, among other things, the differential gear set 26. As such, the fence 28 and the cover 58 can be one unit such that removal of the cover 58 will remove the fence 28 from the carrier housing 34.

Figure 6:
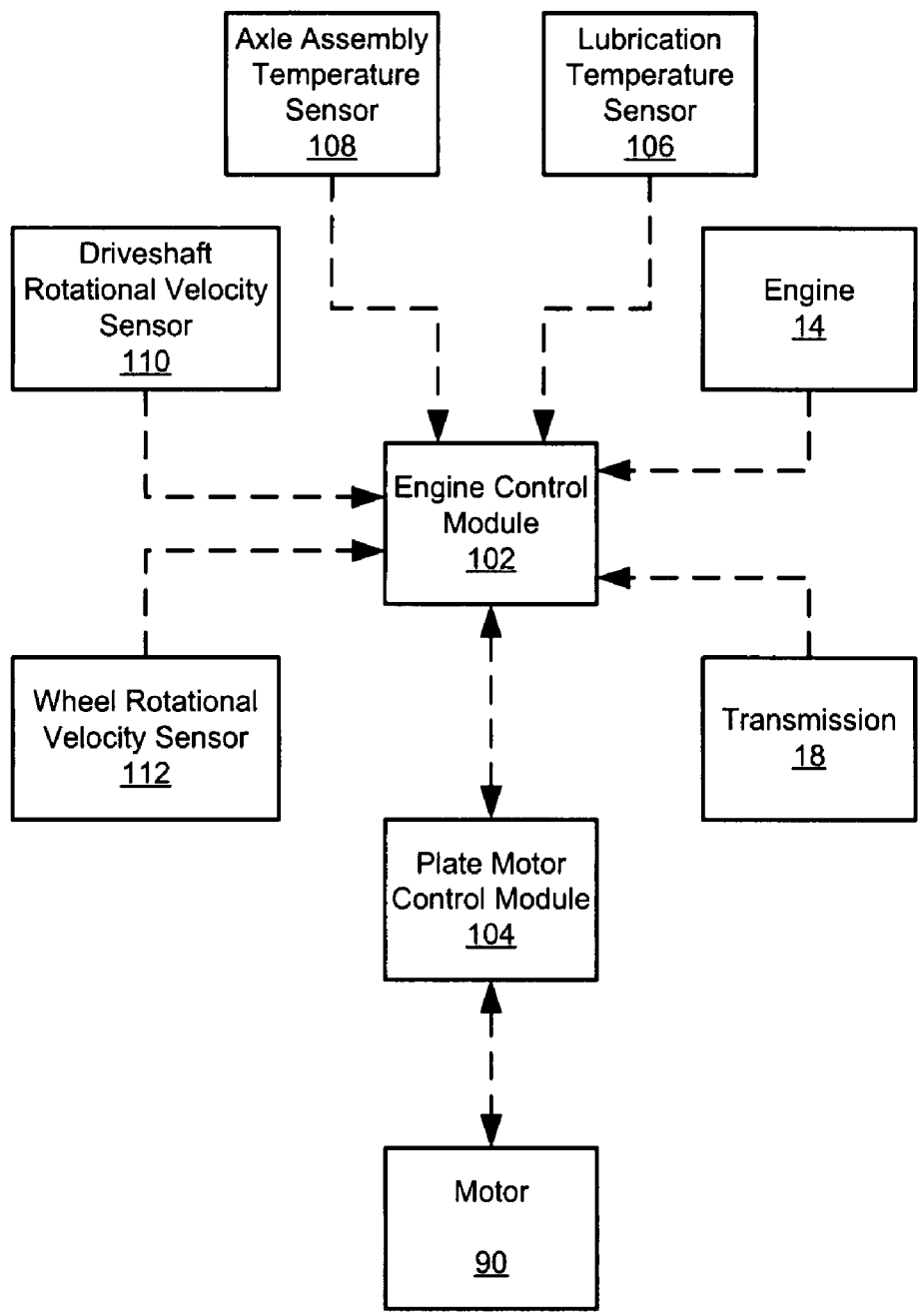
FIG. 6 is a schematic of exemplary control system components associated with the variable oil flow mechanisms of the present invention.

With reference to FIG. 6, the motor 90 and/or the movable plate 30 may be connected to a vehicle communications network (e.g., a CAN bus system and/or other suitable vehicle communications systems) via a communication link 100. An engine control module 102 may communicate with a motor control module 104 via the communications network. It will be appreciated that the above control modules 102, 104 may be sub-modules of an engine computer or specific module in communication therewith. The motor control module 104 may communicate with the engine control module 102 to determine various vehicle and/or engine parameters including, but not limited to, engine speed, transmission speed and/or gear, lubrication temperature and/or ambient temperature.

In one example, the engine control module 102 may communicate with a lubrication temperature sensor 106, an axle assembly temperature sensor 108, a driveshaft rotational velocity sensor 110 and/or a wheel rotational velocity sensor 112. The engine control module 102 may also communicate with the motor control module 104, which in turn may communicate with the motor 90 that moves the moveable plate 30. It will be appreciated that one or more of the above-mentioned sensors 106, 108, 110 and 112 may directly and/or indirectly communicate with the control module 102 and/or the motor control module 104. Moreover, not all of the above-mentioned sensors 106, 108, 110 and 112 need be present to implement the various examples of the present invention.

The lubrication temperature sensor 106 may be located in the carrier housing 34 (FIG. 1) and/or other portions of the axle assembly 12. The lubrication temperature sensor 106 may detect a lubrication temperature therein. The axle assembly temperature sensor 108 may detect an axle assembly temperature. The axle assembly temperature sensor 108 may detect a housing material temperature (i.e., a metal temperature) or an air temperature within the carrier assembly housing 34 and/or other portions of the axle assembly 12. It will be appreciated that temperature may be determined at various location within the axle assembly 12 (FIG. 1). It will also be appreciated that both the lubrication temperature sensor 106 and the axle assembly temperature sensor 108 need not be used to make the various examples of the present invention operable. In one example, the temperature determined by the lubrication temperature sensor 106 may serve as proxy for axle assembly temperature. In another example, the temperature determined by the axle assembly temperature sensor 106 may serve as proxy for lubrication temperature. As below explained, temperatures of other components and/or fluid may serve as proxies for axle assembly temperature and/or lubrication temperature.

The driveshaft rotational velocity sensor 110 may be located in the transmission 18 and/or the carrier housing 34 (i.e., multiple sensors). The driveshaft rotational velocity sensor 110 may detect driveshaft rotational velocity directly, for example, with a Hall Effect sensor or other suitable sensor. The driveshaft rotational velocity sensor 110 may also detect driveshaft rotational velocity indirectly, for example, by determining the driveshaft rotational velocity based on engine speed and a transmission gear.

The wheel rotational velocity sensor 112 may be located near the driven-wheels 22 (FIG. 1) and/or the optionally-driven-wheels 24 (FIG. 1). For example, the wheel rotational velocity sensor 112 may detect wheel rotational velocity via an anti-lock brake sensor in a manner known in the art. In another example, the wheel rotational velocity sensor 112 may detect wheel rotational velocity be detecting the rotational velocity of a component to which a wheel is coupled (e.g., the ring gear 40 is coupled to one of the driven-wheels 22). It will be appreciated that multiple wheel rotational velocity sensors 112 may be employed to communicate the rotational velocity of each wheel to the engine control module 102 and/or the motor control module 104.

The motor 90 can adjust the position of the movable plate 30 based on engine speed, lubrication temperature, axle assembly temperature, driveshaft, rotational velocity, wheel rotational velocity, transmission speed and/or combinations thereof. It will be appreciated that specific axle assembly models may dictate additional factors and variables that can effect the positioning of the movable plate 30. In one example, the motor control module 104 may command the motor 90 to move the moveable plate 30 based on driven wheel rotational velocity and axle assembly temperature. In another example, the motor control module 104 may command the motor 90 to move the moveable plate 30 based on driveshaft rotational velocity and axle assembly temperature. When the driven wheel rotational velocity, the driveshaft rotational velocity and/or axle assembly temperature increases, the movable plate 30 can be moved toward the ring gear 40. It will be appreciated that as the driven wheel rotational velocity increases the churning and/or tossing of the lubrication 48 may also increase. To increase the cooling efficacy of the lubrication 48, the movable plate can be urged toward the teeth 52 of the ring gear 40 thus further reducing churning losses of the lubricant.

In one example, the movable plate 30 can move sufficiently close to the teeth 52 of the ring gear 40 to at least partially skim the lubricant off the face of each tooth 52 of the ring gear 40 before the ring gear 40 is able to throw (i.e. churn and/or toss) the lubrication 48 around the carrier housing 34. When the driven wheel rotational velocity, the driveshaft rotational velocity and/or axle assembly temperature is reduced, the motor control module 104 can command the motor 90 to move the movable plate 30 toward its open position 78. In another example, when the engine 14 is turned off, the movable plate 30 can be moved to its open position 78. In a further example, when the driven wheel rotational velocity and/or driveshaft velocity is increased but the axle assembly temperature and/or lubrication temperature remains relatively low, the movable plate can remain in its open position 78.

Figure 7:
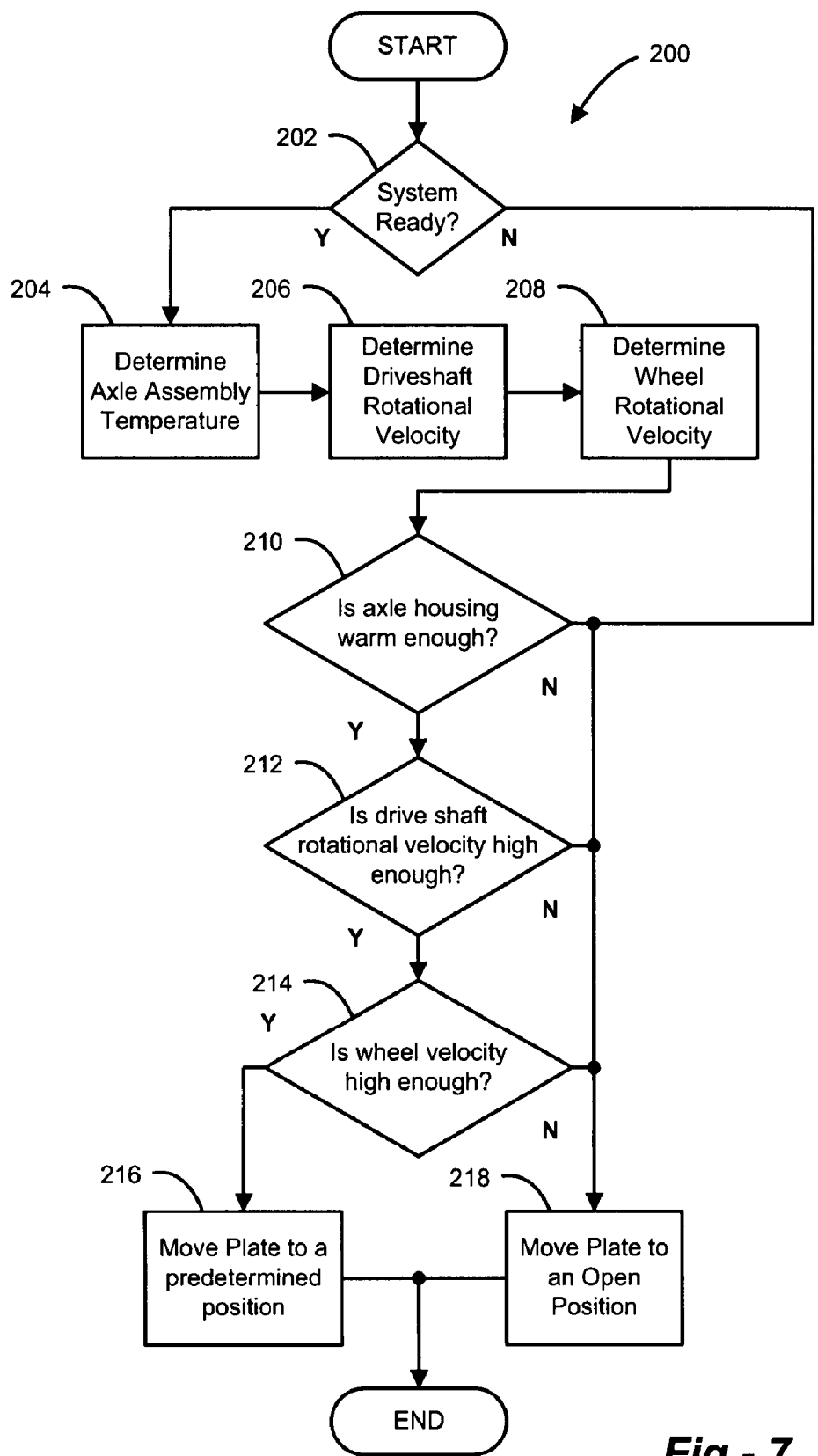
FIG. 7 is a flow chart of an exemplary control system for controlling actuation of the variable oil flow mechanisms.

With reference to FIG. 7, an exemplary control system 200 is illustrated in accordance with the teachings of the present invention. In step 202, the control system 200 determines if the system is ready. When the control system 200 determines that the system is ready, it continues to step 204. When the control system 200 determines that the system is not ready, it continues to the below-described step 218. The control system 200 determines if the system is ready by, for example, determining if any system faults have been communicated to the control module 102, via the vehicle communications network (e.g., the CAN bus system) such as, but not limited to, an electrical problem, an inability to detect sensors and/or engine trouble. Control system 200 may also determine whether the transmission 18 (FIG. 1) is in a forward gear (e.g., drive and/or 1st gear, second gear etc.). In one example, control system 200 may determine that the system is not ready unless the transmission 18 is in the aforementioned forward gears.

In step 204, control system 200 determines an axle assembly temperature. In one example, the axle assembly temperature may be determined from the axle assembly temperature sensor 108 (FIG. 6). In another example, the axle assembly temperature may be determined from the lubrication temperature sensor 106 (FIG. 6). In a further example, the axle assembly temperature may be determined from an estimate of the axle assembly temperature based on other engine temperatures and the duration at which the differential gear set 26 has been rotating. More specifically, a base engine temperature can be determined from the engine 14 (e.g., a coolant and/or oil temperature). The engine control module 102 may then estimate, based on an elapsed time at a certain engine speed, how much the differential gear set 26 may have heated the axle assembly 12. Based on the engine temperature and the estimated heat produced in the axle assembly 12, the engine control module 102 may estimate the axle assembly temperature. From step 204, control system 200 continues to step 206.

In step 206, control system 200 determines a driveshaft rotational velocity. Control system 200 may determine the driveshaft rotational velocity by communicating with the driveshaft rotational velocity sensor 110 (FIG. 6). In one example, control system 200 may determine the engine speed and the gear in which the transmission 18 is engaged and thus, determine the rotational velocity of the driveshaft 20 based on the engine 14 (FIG. 1) and the transmission 18 (FIG. 1). From step 206, control system 200 continues to step 208.

In step 208, control system 200 determines a wheel rotational velocity. Control system 200 may determine the wheel rotational velocity by communicating with the wheel rotational velocity sensor 112 (FIG. 6). In one example, the wheel rotational velocity sensor 112 may detect the rotational velocity of the each of the driven-wheels 22 (FIG. 1). In another example, the wheel rotational velocity sensor 112 may detect the rotational velocity of all of the wheels 22, 24 (FIG. 1). In a further example, the control system 200 may determine the engine speed and the gear in which the transmission is engaged and thus, determine the rotational velocity of the output of the transmission (i.e., rotational velocity of the driveshaft) based on known transmission gear ratios and engine speeds. Based on the rotational velocity of the driveshaft, the rotational velocity of the ring gear 40 may be determined. Based on the rotational velocity of the ring gear 40, the rotational velocity of one or more of the driven-wheels 22 may be determined. From step 208, the control system 200 continues to step 210.

In step 210, control system 200 determines whether the axle assembly 12 is warm enough. When control system 200 determines that the axle assembly temperature is warm enough, it continues to step 212. When the control system 200 determines that the axle assembly temperature is not warm enough, it continues to step 218. In one example, the lubrication temperature may serve as a proxy for axle assembly temperature and, as such, step 208 may determine whether the lubrication temperature is warm enough. The axle assembly 12 may be warm enough when the lubrication temperature is about 100° C. to about 120° C. (about 212° F. to about 248° F.). It will be appreciated that the operating range of temperatures for the lubrication 48 in the carrier assembly housing 34 can be based on a specific axle assembly model.

In step 212, control system 200 determines whether the driveshaft rotational velocity is high enough. When control system 200 determines that the driveshaft rotational velocity is high enough, it continues to step 214. When control system 200 determines that the driveshaft rotational velocity is not high enough, it continues to step 218. In one example, the rotational velocity of the driveshaft 20 (FIG. 1) is high enough when the driveshaft rotational velocity is about 2,000 revolutions per minute. It will be appreciated that the rotational velocity of the driveshaft 20, as above-described, may be based on the gear in which the transmission 18 (FIG. 1) is engaged and the engine speed. It will further be appreciated that the rotational velocity may be based on the axle assembly model and moreover be based on driving style and in situ settings of the engine control module 102. More specifically, control system 200 may determine (e.g., learn) that driving style has departed from a nominal driving style and set a lower driveshaft rotational velocity threshold.

In step 214, control system 200 determines whether the wheel rotational velocity is high enough. When control system 200 determines that the wheel rotational velocity is high enough, it continues to step 216. When control system 200 determines that the driveshaft rotational velocity is not high enough, it continues to step 218. It will be appreciated that the wheel rotational velocity may be based on axle assembly model and moreover be based on driving style and in situ settings of the control module 102. More specifically, control system 200 may determine (e.g., learn) that the driving style has departed from a nominal driving style and set a lower wheel rotational velocity threshold. In one example, a vehicle forward velocity of 60 miles per hour in a certain transmission gear may provide a high enough wheel rotational velocity.

In step 216, control system 200 positions the moveable plate 30 toward the teeth 52 of the ring gear 40 at a predetermined position based on driven wheel rotational velocity, driveshaft rotational velocity and/or axle assembly temperature. In one example, control system 200 positions the moveable plate 30 based on additional variables such, but not limited to, engine speed, transmission speed, lubrication temperature, gear in which the transmission is engaged, ambient temperature and/or combinations thereof. It will be appreciated that the position of the moveable plate 30 relative to the teeth 52 of the ring gear 40 may be based on an iterative process of determining lubrication temperature, driveshaft rotational velocity, wheel rotational velocity and other suitable variables as the moveable plate 30 is moved closer to or further from the teeth 52 of the ring gear 40. More specifically, control system 200 may poll lubrication temperature and adjust the position of the moveable plate 30 using suitable control logic (e.g., a PID controller). In other examples, control system 200 can reference a look up table based on lubrication temperature and/or driveshaft rotational velocity. Based on the value determined in the look up table, control can position the movable plate 30 to the predetermined position.

In step 218, control system 200 moves the plate 30 to the open position 78. The open position 78, as defined, is the position farthest from the teeth 52 of the ring gear 40 relative to the closed position 80. The closed position 80 is defined by the position of the movable plate 30 that is closest to the teeth 52 of the ring gear 40 relative the open position 78.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An axle assembly, comprising:
   a housing defining a chamber partially filled with fluid;
   a differential rotatably supported in said chamber such that rotation of said differential causes flow of said fluid; and
   a variable flow control mechanism disposed within said chamber and having a plate supported for movement relative to said differential and an actuator for moving said plate.

2. The axle assembly of claim 1 wherein said plate is moveable between a first position relative to said differential for reducing flow of said fluid and a second position relative to said differential for increasing flow of said fluid.

3. The axle assembly of claim 2 wherein said plate is biased by a biasing mechanism toward said second position.

4. The axle assembly of claim 1 wherein said plate is supported for sliding movement relative to said differential on a fence member secured to said housing.

5. The axle assembly of claim 4 wherein said housing includes an axle carrier and a cover secured to said axle carrier, and wherein said fence member is secured to at least one of said axle carrier and said cover.

6. The axle assembly of claim 1 wherein said differential includes a ring gear rotatably driven by a pinion shaft, and wherein said plate is moveable between a first position adjacent to said ring gear and a second position displaced from said ring gear, said actuator operable to move said plate in response to a control signal.

7. The axle assembly of claim 6 wherein said variable flow control mechanism further includes a control system operable for generating said control signal and actuating said actuator in response thereto.

8. The axle assembly of claim 7 wherein said actuator includes an electric motor.

9. The axle assembly of claim 7 wherein said control signal is based on one of a fluid temperature within said chamber and a rotational speed of said differential.

10. The axle assembly of claim 6 wherein said variable flow control mechanism further includes a fence on which said plate is supported for movement between its first and second positions.

11. The axle assembly of claim 10 wherein said housing includes an axle carrier and a cover secured to said carrier, and wherein said fence is secured to at least one of said carrier and said cover in proximity to teeth on said ring gear.

12. An axle assembly, comprising:
    a housing partially filled with lubricating fluid;
    a differential rotatably supported in said housing and having a ring gear; and
    a plate supported by said housing for movement relative to said ring gear between a first position adjacent to said ring gear and a second position displaced from said ring gear for varying the flow of said fluid caused by rotation of said ring gear.

13. The axle assembly of claim 12 wherein said plate is biased by a spring toward its second position.

14. The axle assembly of claim 12 further comprising a power-operated actuator operable for moving said plate between its first and second positions, and a control system for actuating said actuator in response to a control signal.

15. The axle assembly of claim 14 wherein said control signal is based on at least one of a fluid temperature within said housing and a rotational speed of said differential.

16. The axle assembly of claim 12 wherein said housing includes an axle carrier and a cover secured to said carrier, and wherein said plate is supported for sliding movement relative to said ring gear on a support member secured to at least one of said carrier and said cover.

17. An axle assembly, comprising:
    an axle housing including a carrier and cover interconnected to define a chamber partially filled with a lubricating fluid;
    a differential rotatably supported within said chamber and partially submerged in said fluid; and
    a variable flow control mechanism supported from one of said carrier and said cover within said chamber and having a plate moveable relative to said differential between first and second positions.

18. The axle assembly of claim 17 wherein said variable flow control mechanism further includes an actuator for controlling movement of said plate.

19. The axle assembly of claim 18 wherein said actuator is a power-operated device operable in response to a control signal generated by a control system.

20. The axle assembly of claim 19 wherein said control signal is based on at least one of a fluid temperature within said chamber and a rotational speed of said differential.

21. An axle assembly, comprising:
    an axle housing defining a chamber;
    a differential rotatably supported within said chamber;
    a lubricating fluid disposed in said chamber such that a portion of said differential rotates through said fluid;
    a plate supported within said chamber for movement between first and second positions relative to said differential; and
    a power-operated actuator for moving said plate between its first and second positions to vary flow of said fluid that is generated in response to rotation of said differential.

22. The axle assembly of claim 21 wherein said differential includes a ring gear which rotates through said fluid, and wherein said plate is moveable relative to said ring gear between its first position adjacent thereto and its second position displaced therefrom.

23. A method of controlling the flow of lubricating fluid within an axle assembly, comprising:
    providing an axle housing having a chamber partially filled with the fluid;
    rotatably supporting a differential within said chamber such that a portion of said differential rotates through the fluid; and moving a plate relative to said differential to vary flow of the fluid generated in response to rotation of said differential.

24. The method of claim 23 wherein said plate skims more of the fluid off of said differential in a closed position located proximate to said differential than in an open position displaced from said differential.

25. An axle assembly, comprising:
a housing defining a chamber;
   a differential rotatably supported in said chamber;
   a drive mechanism for driving said differential including a ring gear secured to said differential and a pinion shaft driving said ring gear;
   a sump of fluid retained within said chamber such that rotation of said ring gear causes flow of said fluid; and
   a variable flow control mechanism disposed between said ring gear and said fluid sump which includes a plate supported in said housing for movement relative to said ring gear, and an actuator for moving said plate.

26. The axle assembly of claim 25 wherein teeth on said ring gear generate flow of said fluid in response to rotation of said ring gear, and wherein said plate is moveable relative to said ring gear between a first position adjacent to said teeth and a second position displaced from said teeth.

27. The axle assembly of claim 26 wherein said variable flow control mechanism further includes a spring for biasing said plate toward one of its first and second positions, and wherein said actuator is operable to move said plate in opposition to the biasing of said spring.

* * * * *